Choplain & Chollet,
Stringing Pianos,
No. 2,164. Reissued Jan. 30, 1866.
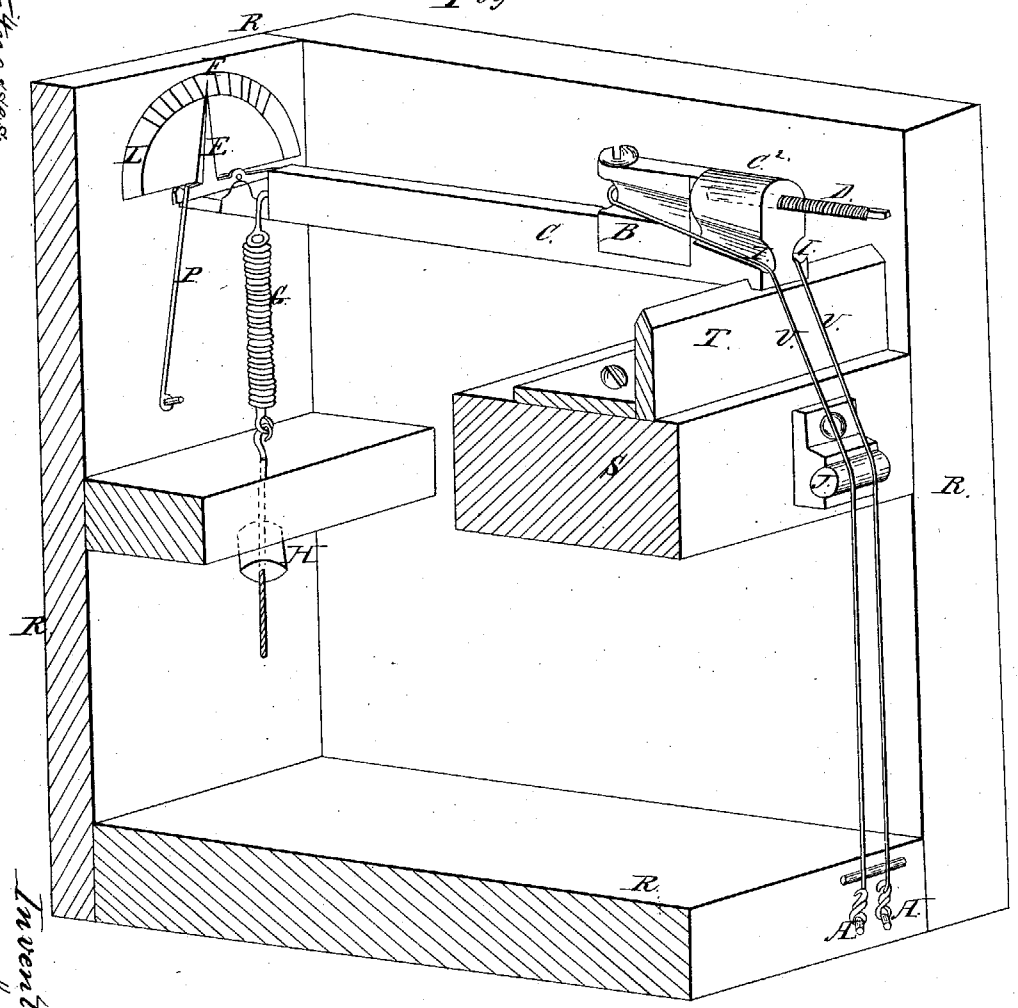
Witnesses:
Felix Simon,
C. S. Barrett.
Inventors:
L. Choplain,
P. E. Chollet.
AM. PHOTO-LITHO. CO. N.Y. (OSBORNE'S PROCESS)

UNITED STATES PATENT OFFICE.

ANTOINE CHOPLAIN AND PIERRE E. CHOLLET, OF NEW YORK, N. Y.

IMPROVEMENT IN STRINGING PIANOS.

Specification forming part of Letters Patent No. 51,559, dated December 19, 1865; Reissue No. 2,164, dated January 30, 1866.

*To all whom it may concern:*

Be it known that we, ANTOINE CHOPLAIN and PIERRE E. CHOLLET, of the city, county, and State of New York, have invented certain new and useful improvements in regulating and registering the tension of piano-forte strings; and we do hereby declare the following to be a full description of the same.

The object of our invention is to simplify the operation of tuning piano-fortes, so that any person, by mere inspection of a dial-plate and indicator, may tune the instrument as well as if he were a professor of music; and the nature of our invention consists, first, in the arrangement of a lever, supported at its front end upon a knife-edge prop, in combination with a tension-slide on the said lever, operated by a screw, for the purpose of regulating the tension of the strings of the piano; and, second, in the method of registering the tension of the strings by means of a dial-plate and indicator, operated by the back end of the lever, in consequence of the tension-slide being moved out or in on it in the operation of tuning the piano, thereby depressing or elevating the end of the lever, and in doing so operating the indicator or pointer to register the tension or tone of the strings.

But to describe our invention more particularly, we will refer to the accompanying drawing, forming a part of this specification, the same letters of reference, wherever they occur, referring to like parts.

The figure is a perspective view of the mechanism, as arranged in a vertical pianoforte.

Letter R represents the frame of an upright piano-forte, though this is not material, as a horizontal frame can be used equally well for the purpose of attaching the apparatus thereto for regulating and registering the tension of the strings. Upon a cross-bar, S, of the frame is secured a knife-edge prop, T, on the edge of which is adjusted the front end of a lever, C, at right angles, or nearly so, to the knife-edge prop. Through the head $C^2$ of the lever is inserted a set-screw, D, which is operated by a key, or other common and well-known device, to move a tension slide, B, adjusted upon the upper edge of the lever C. The object of this adjustment of the slide is to regulate the tension of the piano-forte strings U, which pass around it and back through grooves or channels I, formed in the sides of the head-piece $C^2$, and thence down over a roller-bridge, J, secured to the face of the cross-bar S across the instrument, to pins A in the bottom of the frame R, where the two ends of the strings are secured.

It will be apparent, therefore, from this arrangement of the strings that by forcing the slide B out or back on the lever by means of the set-screw D the tension of the strings are readily graduated to any tone or pitch-note required to tune the piano, and at the same time is registered on a dial-plate, L, by means of an indicator or pointer, E, secured by a center-pin to the frame R by the motion of the outer end of the lever C, when it is depressed or elevated, in consequence of the slide B moving out or back on it in the act of graduating the tension of the strings. Thus, if the indicator stands at zero-point F, and the slide B is moved out toward the end of the lever, it will be depressed, and the indicator moved one or more degrees to the left to register the tension or pitch-note of the strings; but if the pitch-note is too high, and the slide is retracted on the lever, then its point rises and carries the indicator to the right of zero-point one or more degrees to lessen the tension of the strings, to produce the required tone or pitch-note.

It will thus be apparent that any pitch-note of the strings once registered on the dial may be restored by simple inspection on turning the set-screw without reference to any previous knowledge of music.

For the purpose of sustaining the end of the lever in position, a spring, G, is attached to it, having its lower end, H, secured to the frame R. A reacting spring, P, is also attached to the indicator or pointer for the purpose of keeping it in contact with the end of the lever.

It will be obvious that a rack and pinion, or other suitable and well-known devices for indicating the amount of motion in the end of the lever, may be substituted for the pointer tc show or register the variation of tension or tone of the strings. We therefore do not limit ourselves to the precise device hereinbefore described, but intend to use any equivalent device for the purpose set forth, as our invention is for the registration of the tone of the piano by means of the varying motion of the end of a lever, in consequence of the change of position of the tension-slide thereon.

Having now described our invention, we will proceed to set forth what we claim and desire to secure by Letters Patent of the United States—

1. The use of the lever C, substantially as described, in combination with the tension-slide B and knife edge prop T, arranged and operating substantially as hereinbefore set forth, for the purpose of regulating the tension of the strings of piano-fortes.

2. The use of the lever C, in combination with the indicator E and dial-plate L or other equivalent devices, for registering the tension or tone of the strings of a piano-forte, substantially as hereinbefore set forth.

A. CHOPLAIN.
P. E. CHOLLET.

Witnesses:
FELIX SIMON,
C. L. BARRITT.